(12) United States Patent
Lai Lee

(10) Patent No.: US 6,474,200 B2
(45) Date of Patent: Nov. 5, 2002

(54) LEVERAGE WRENCH

(76) Inventor: Yu Lan Lai Lee, No. 7, Lane 509 Pei Tung Rd. Pei Tung District, Taichung (TW)

( * ) Notice: Subject to any disclaimer, the term of this patent is extended or adjusted under 35 U.S.C. 154(b) by 0 days.

(21) Appl. No.: 10/045,359

(22) Filed: Jan. 15, 2002

(65) Prior Publication Data

US 2002/0056343 A1 May 16, 2002

(30) Foreign Application Priority Data

Nov. 6, 2000 (TW) .................................. 89219194 U

(51) Int. Cl.⁷ .............................................. B25B 13/00
(52) U.S. Cl. ............................. 81/58.1; 81/60; 81/58.5
(58) Field of Search ..................... 81/58, 58.1, 58.5, 81/60

(56) References Cited

U.S. PATENT DOCUMENTS 2,726,563 A * 12/1955 Blackburn .................. 81/58.1
2,972,919 A * 2/1961 Stalkup ......................... 81/63
3,286,560 A * 11/1966 Murray ........................ 81/58.1
3,726,161 A * 4/1973 Williams et al. ............. 81/58.1
3,941,017 A * 3/1976 Lenker et al. ............... 81/58.1
4,546,676 A * 10/1985 Kiefer, Jr. .................... 81/58.1

* cited by examiner

Primary Examiner—Eileen P. Morgan
Assistant Examiner—Joni B. Danganan
(74) Attorney, Agent, or Firm—Harrison & Egbert

(57) ABSTRACT

A leverage wrench includes a frame seat having a guide seat which is provided with a position-confining hole. The guide seat is pivoted with two inner support plates such that a guide bolt of the inner support plates is received in the position-confining hole. The frame seat is pivoted with two outer support plates which are in turn pivoted with the inner support plates. The inner support plates are jointly fastened to a movable lever. The outer support plates are jointly fastened to a fixed handle.

1 Claim, 4 Drawing Sheets

LEVERAGE WRENCH

BACKGROUND OF THE INVENTION

1. Field of the Invention

The present invention relates generally to a wrench, and more particularly to a leverage wrench which is provided with an additional wrenching force resulting from the leverage.

2. Description of Related Art

The conventional wrench is generally limited in the wrenching force and is often unable to turn a rusty nut or bolt. As a result, the conventional wrench is often useless in a situation calling for the use of a wrench to unfasten the nuts or bolts of a flat tire. There are other occasions on which the conventional wrench is not particularly helpful in light of its limitation in the wrenching force.

BRIEF SUMMARY OF THE INVENTION

The primary objective of the present invention is to provide a wrench with means to increase the wrenching force of the wrench.

The wrench of the present invention has a head comprising a frame seat having a guide seat which is provided with a position-confining hole. The guide seat is pivoted with two inner support plates such that the guide bolt of the inner support plates is received in the position-confining hole. The frame seat is pivoted with two outer support plates which are in turn pivoted with the inner support plates. The inner support plates are fastened to a movable lever, whereas the outer support plates are fastened to a fixed handle.

The features and functions of the present invention will be more readily understood upon a thoughtful deliberation of the following detailed description of a preferred embodiment of the present invention with reference to the accompanying drawings.

DETAILED DESCRIPTION OF THE INVENTION

Figure 1:
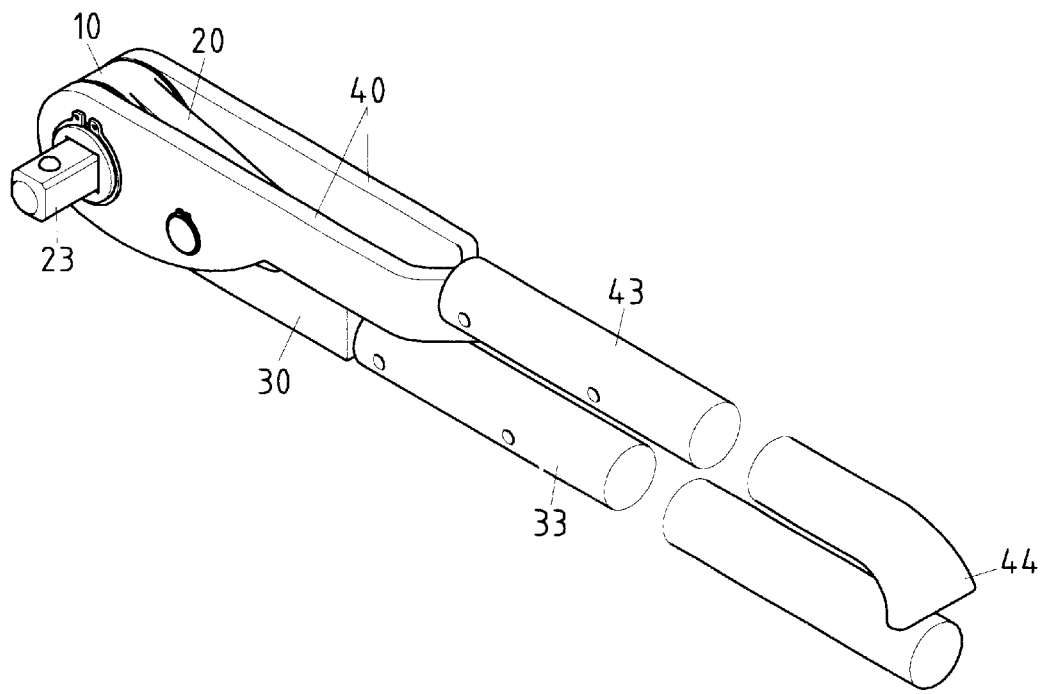
FIG. 1 shows a perspective view of the preferred embodiment of the present invention.
Figure 2:
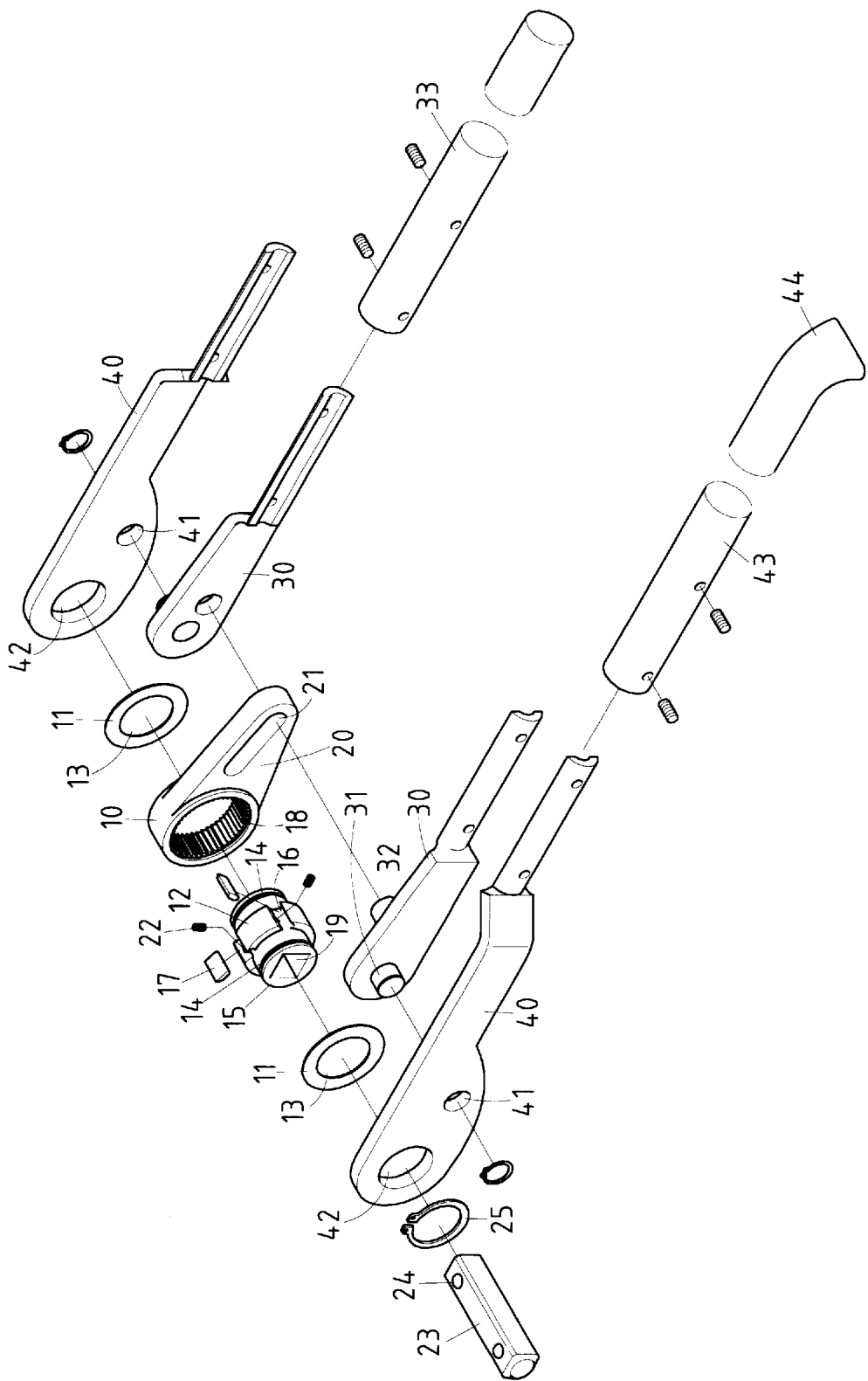
FIG. 2 shows an exploded perspective view of the preferred embodiment of the present invention.

As shown in all drawings provided herewith, a leverage wrench of the present invention has a head portion comprising a frame seat 10 having a ratchet surface 18. The frame seat 10 is provided in two sides with a circular plate 11. A rotary shaft seat 12 is disposed in the frame seat 10 and between the two circular plates 11. The rotary shaft seat 12 has two circular projections 15, each having a circular retaining groove 14 and extending out of a fitting hole 13 of the circular plates 11. The rotary shaft seat 12 is provided in the periphery with a plurality of slots 16 in which a ratchet piece 17 and a tension element 22 are disposed in such a manner that the ratchet piece 17 is exerted on by the force of the tension element 22 to press against the ratchet surface 18 of the frame seat 10, and that the ratchet piece 17 is capable of forward and backward movements. A shaft rod 23 is provided with two locating projections 24 opposite to each other and is put through the rotary shaft seat 12 and a through hole 19 of the circular projections 15.

The present invention is characterized by the frame seat 10 which has a guide seat 20 with a position-confining hole 21. The guide seat 20 is provided with two inner support plates 30 opposite to each other and having a pillar 31. Located between the two inner support plates 30 is a guide bolt 32 which is movably received in the position-confining hole 21. The two inner support plates 30 are jointly fastened with a movable lever 33. The two circular plates 11 of two sides of the frame seat are provided with an outer support plate 40 which is provided with a fitting hole 42. The two circular projections 15 of the rotary shaft seat 12 are extended out of the fitting holes 42 of the two outer support plates 40 in conjunction with a retaining ring 25 which is located in the circular retaining groove 14. The outer support plates 40 are provided with a through hole 41 corresponding in location to the pillar 31 of the inner support plates 30 for the purpose of pivoting the inner support plates 30 and the outer support plates 40. The two outer support plates 40 are jointly fastened with a fixed handle 43 which is provided at the free end with a curved edge 44.

Figure 3:
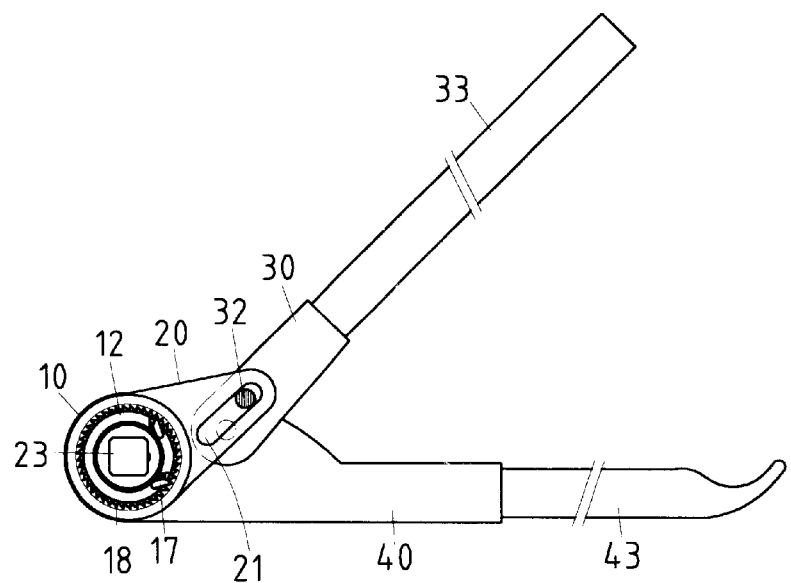
FIG. 3 shows a side schematic view of the preferred embodiment of the present invention.
Figure 4:
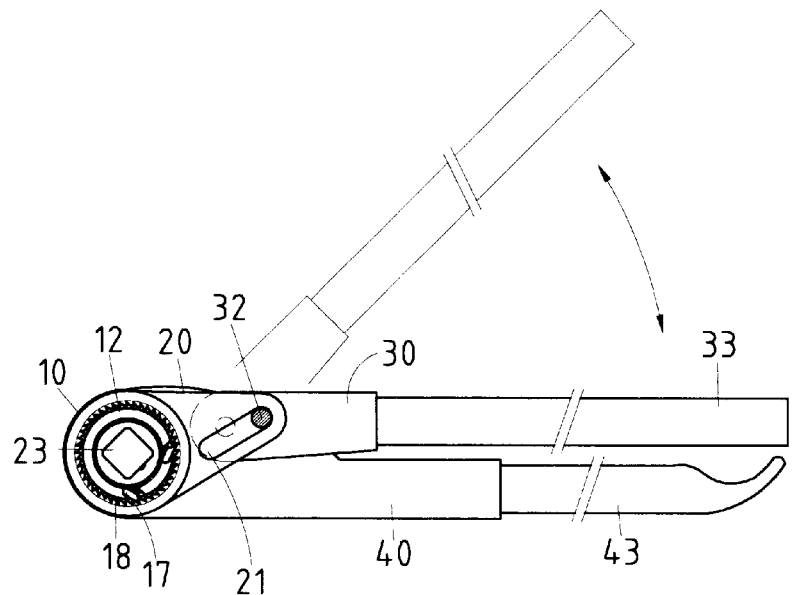
FIG. 4 shows a schematic view of the preferred embodiment of the present invention in action.
Figure 5:
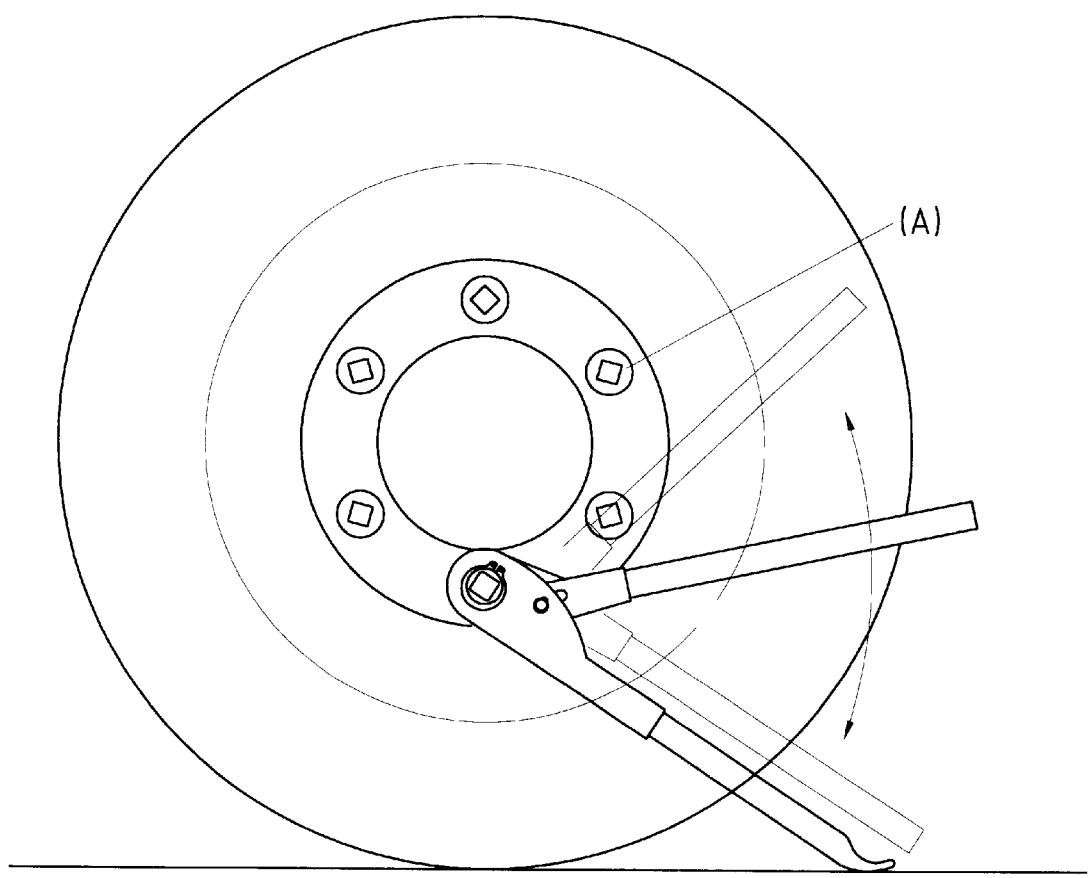
FIG. 5 shows a schematic view of the preferred embodiment of the present invention at work.

As shown in FIGS. 3 and 4, the movable lever 33 is engaged in a reciprocating motion such that the guide bolt 32 is caused to slide in the position-confining hole 21 of the guide seat 20, thereby actuating the guide seat 20 to swivel back and forth. In the meantime, the ratchet piece 17 is capable of forward and backward motions against the ratchet surface 18 of the frame seat 10. The shaft rod 23 is thus driven to turn in one direction, so as to unfasten or fasten a bolt "A" as shown in FIG. 5.

The embodiment of the present invention described above is to be regarded in all respects as being merely illustrative and nonrestrictive. Accordingly, the present invention may be embodied in other specific forms without deviating from the spirit thereof. The present invention is therefore to be limited only by the scope of the following claim.

I claim:

1. A wrench comprising:

a frame seat having a ratchet surface, said frame seat having a first circular plate on one side thereof and a second circular plate on an opposite side thereof, each of said circular plate having a fitting hole formed therein;

a rotary shaft seat disposed in said frame seat between said first and second circular plates, said rotary shaft seat having a first circular projection on one side thereof and a second circular projection on an opposite side thereof, each of the circular projections having a circular retaining groove extending outwardly of the fitting hole of the circular plate, said rotary shaft seat having a plurality of slots formed in a periphery thereof, said plurality of slots respectively receiving a ratchet piece and a tension element therein, said tension element urging said ratchet piece against said ratchet surface of said frame seat, said rotary shaft seat having a through hole extending therethrough;

a shaft rod extending through said through hole, said shaft rod having locating projections at respective opposite ends of said rotary shaft seat, said frame seat having a guide seat formed thereon, said guide seat having a position confining hole formed therein;

a pair of inner support plates positioned respectively on opposite sides of said guide seat, each of said pair of inner support plates having a pillar extending outwardly therefrom, one of said pair of inner support plates having a guide bolt movably received in said position confining hole and extending between said pair of inner support plates;

a moveable lever having an end receiving and fastened to said pair of inner support plates;

a pair of outer support plates affixed respectively to opposite sides of said frame seat, each of said pair of outer support plates having a fitting hole through which the respective circular projection of said rotary shaft seat extends, a retaining ring being affixed to the circular retaining groove, each of said pair of outer support plates having a through hole formed therein so as to receive the respective pillar of said pair of inner support plates so as to pivot said pair of inner support plates and said pair of outer support plates with respect to each other; and a fixed handle fastened to said pair of outer support plates.

* * * * *